(12) United States Patent
Higuchi (10) Patent No.: US 10,621,131 B2
(45) Date of Patent: Apr. 14, 2020

(54) BRIDGE CONNECTING APPARATUS, COMMUNICATION CONTROL SYSTEM, METHOD AND PROGRAM

(71) Applicant: NEC Corporation, Minato-ku, Tokyo (JP)

(72) Inventor: Junichi Higuchi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/085,634

(22) PCT Filed: Mar. 22, 2017

(86) PCT No.: PCT/JP2017/011378
§ 371 (c)(1),
(2) Date: Sep. 17, 2018

(87) PCT Pub. No.: WO2017/164218
PCT Pub. Date: Sep. 28, 2017

(65) Prior Publication Data
US 2019/0108155 A1    Apr. 11, 2019

(30) Foreign Application Priority Data
Mar. 24, 2016    (JP) ................................. 2016-060072

(51) Int. Cl.
*G06F 13/40*    (2006.01)
*H04L 12/46*    (2006.01)
(Continued)

(52) U.S. Cl.
CPC ...... *G06F 13/4027* (2013.01); *G06F 11/3027* (2013.01); *G06F 11/3051* (2013.01);
(Continued)

(58) Field of Classification Search
CPC ............. G06F 11/3027; G06F 11/3051; G06F 13/4027; G06F 13/4022
See application file for complete search history.

(56) References Cited

U.S. PATENT DOCUMENTS

| 2014/0115359 | A1* | 4/2014 | Higuchi | G06F 1/3206 713/320 |
| 2017/0090823 | A1* | 3/2017 | Kan | G06F 3/0611 |

FOREIGN PATENT DOCUMENTS

| JP | 2012-146088 A | 8/2012 |
| WO | 2014/199692 A1 | 12/2014 |

OTHER PUBLICATIONS

Suzuki, Jun et al.; "Adaptive Memory System over Ethernet"; Hotstorage'10 Proceedings of the 2nd USENIX conference on Hot topics in storage and file systems; Jun. 22, 2010. (Year: 2010).*
(Continued)

*Primary Examiner* — Glenn A. Auve (57) ABSTRACT

A bridge connecting apparatus comprises: a connection state control part that controls a first connection state between the bridge connecting apparatus and the other bridge connecting apparatus; and a connection state monitoring part that monitors the first connection state recognized on the connection state control part and a second connection state between the first device recognized on the OS and the second device. The connection state monitoring part instructs to the connection state control part so that the first connection state does not come into connection when it is detected that the first connection state is at non-connection. The connection state control part controls so that the first connection state does not come into connection according to the instruction from the connection state monitoring part.

9 Claims, 9 Drawing Sheets

(51) Int. Cl.
*G06F 13/00* (2006.01)
*G06F 11/30* (2006.01)
*G06F 13/42* (2006.01)

(52) U.S. Cl.
CPC .......... *G06F 13/00* (2013.01); *G06F 13/4022* (2013.01); *G06F 13/4221* (2013.01); *H04L 12/46* (2013.01)

(56) References Cited

OTHER PUBLICATIONS

International Search Report for PCT Application No. PCT/JP2017/011378, dated Jun. 13, 2017.

\* cited by examiner

BRIDGE CONNECTING APPARATUS, COMMUNICATION CONTROL SYSTEM, METHOD AND PROGRAM

TECHNICAL FIELD

Description of Related Application

The present invention is based on claim to priority of Japanese Patent Application: JP2016-060072 (filed on Mar. 24, 2016), the entire contents of the application shall be incorporated and stated in the present document by reference. The present invention relates to a bridge connecting apparatus, a communication control system, a method and a program performing communication processing so as to be able to selectively communicate between devices.

Background

There is a communication control system using a technology (for example, Expether (registered trademark)) for expanding a configuration of a computer (extending a system bus inside a computer) by using a network such as Ethernet (registered trademark) (see Patent literature 1). Such a communication system is configured so that a CPU (Central Processing Unit) device is communicatably connected to a network via a CPU side bridge connecting apparatus, and an IO (Input/Output) device is communicatably connected to the network via an IO side bridge connection. The CPU side bridge connecting apparatus and the IO side bridge connecting apparatus perform communication processing so as to be able to selectively communicate between the CPU device and the IO device.
[Patent Literature 1]
Japanese Patent Kokai Publication No. JP2012-146088A

SUMMARY

The following analysis is given by the present inventor.
In a communication system using such a CPU side bridge connecting apparatus and an IO side bridge connecting apparatus, when a communication disconnection that can not be recognized at the OS (Operating System: Software) level being executed in the CPU device occurs on a network between the CPU side bridge connecting apparatus and the IO side bridge connecting apparatus, although it is disconnected once on the system bus between the CPU device and the CPU side bridge connecting apparatus and between the IO device and the IO side bridge connecting apparatus and then the IO device 21 is initialized, a state change thereof is not recognized on the OS and a state mismatch between software and hardware occurs, as a result, the IO device can not be used.

Also, in a communication system using a CPU side bridge connecting apparatus and an IO side bridge connecting apparatus, when a communication disconnection that can not be recognized at the OS level occurs, operation becomes impossible if the IO device has a user interface (character user interface, graphical user interface), and for restoration, it was necessary for the user to manually restart the computer main body having the CPU device and the CPU side bridge connecting apparatus.

Therefore, in a communication system using a CPU side bridge connecting apparatus and an IO side bridge connecting apparatus, if a communication disconnection that can not be recognized at the OS level occurs, there was a problem such that working file or the like can not be saved and works can not be restored immediately by taking time to recover.

A main object of the present invention is to provide a bridge connecting apparatus, a communication control system, a method and a program that it is possible to continuously operate even when a communication disconnection that can not be recognized at an OS level occurs.

A bridge connecting apparatus according to a first aspect can be configured as follows.

The bridge connecting apparatus for communicatably connecting between a first device capable of executing an OS and a network, wherein
the bridge connecting apparatus performs communication processing so as to selectively communicate between the first device and the second device by cooperating with another bridge connecting apparatus that communicatably connects between the second device and the network, the bridge connecting apparatus comprises:
a connection state control part that controls a first connection state between the bridge connecting apparatus and the other bridge connecting apparatus; and
a connection state monitoring part that monitors the first connection state recognized on the connection state control part and a second connection state between the first device recognized on the OS and the second device,
the connection state monitoring part instructs to the connection state control part so that the first connection state does not come into connection when it is detected that the first connection state is at non-connection, and
the connection state control part controls so that the first connection state does not come into connection according to the instruction from the connection state monitoring part.

A communication control system according to a second aspect can be configured as follows.

The communication control system comprising:
a bridge connecting apparatus according to the first aspect;
a first device;
another bridge connecting apparatus;
a second device; and
a network(s).

A communication control method according to a third aspect can be configured as follows.

The communication control method for performing communication control so as to be able to selectively communicate between a first device and a second device by cooperating a bridge connecting apparatus with another bridge connecting apparatus, the bridge connecting apparatus communicatably connecting between the first device capable of executing an OS and a network, and the other bridge connecting apparatus communicatably connecting between the second device and the network communicate, the method comprising:
acquiring a first connection state between the bridge connecting apparatus and the other bridge connecting apparatus;
deciding whether the first connection state is at connection or non-connection; and
controlling so that the first connection state does not come into connection when the first connection state is at non-connection.

A communication control program according to a fourth aspect can be configured as follows.

The communication control program that is executed on a first device that is capable of executing an OS and is communicatably connected to a second device via another bridge connecting apparatus, a network(s), and a bridge connecting apparatus, the program executing processings:

monitoring a second connection state between the first device recognized on the OS and the second device, acquiring the second connection state recognized on the OS in response to a request of the second connection state from the bridge connecting apparatus and providing the acquired second connection state to the bridge connecting apparatus.

According to the first to fourth aspects, it is possible to continuously operate even if a communication disconnection that can not be recognized at the OS level occurs.

PREFERRED MODES

Hereinafter, exemplary embodiments will be explained with reference to drawings. When reference numerals to the drawings are attached in the present application, they are exclusively intended to aid understanding and are not intended to be limited to the illustrated mode(s). The following embodiments are merely examples, and they are not intended to limit the present invention. Also, connection lines between blocks in the drawings or the like referred to in the following explanation, include both bidirectional and unidirectional connection lines. The one-way arrow schematically shows a flow of a main signal (data), and it does not exclude bidirectionality.

First Exemplary Embodiment

Figure 1:
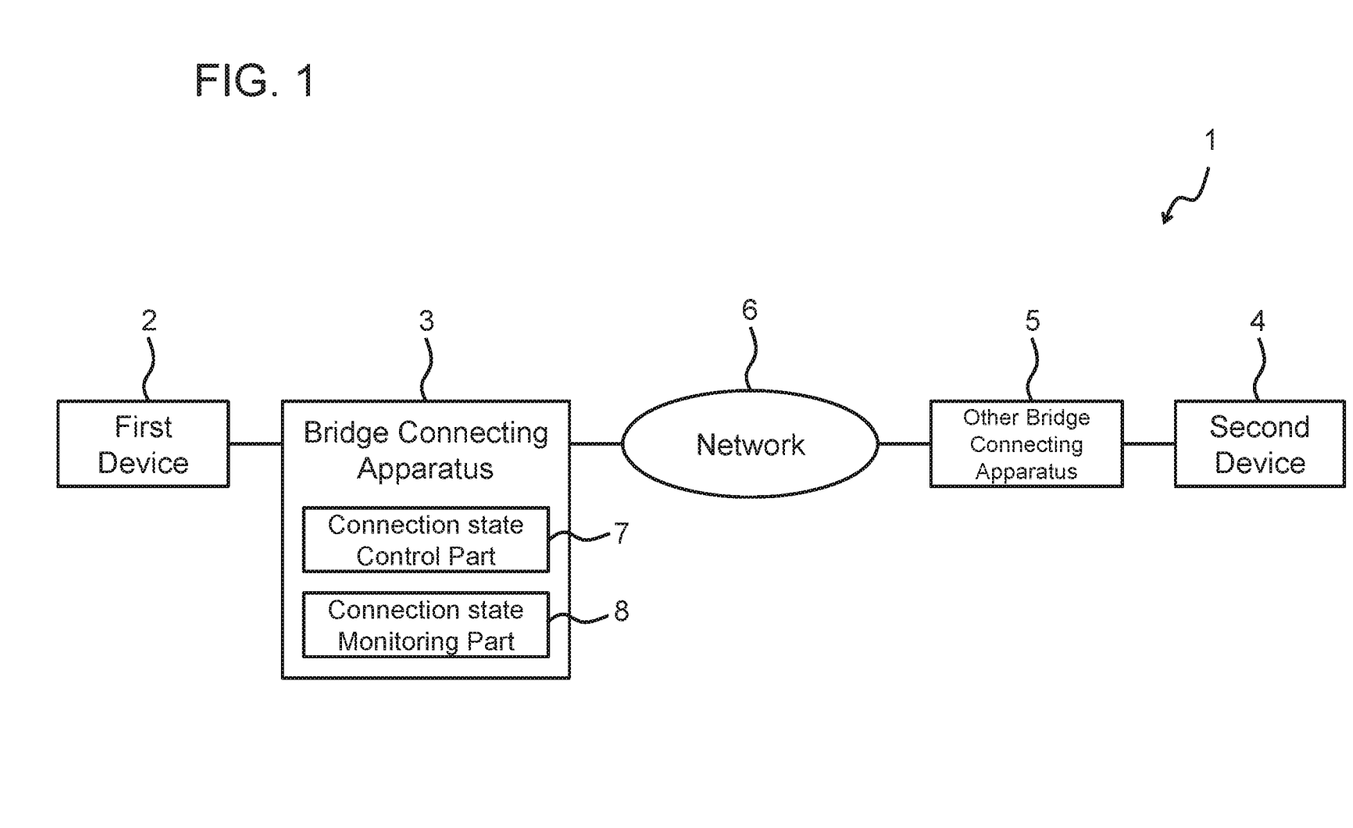
FIG. 1 is a block diagram schematically showing a configuration of a communication control system according to a first exemplary embodiment.

A communication control system according to a first exemplary embodiment will be explained with reference to drawings. FIG. 1 is a block diagram schematically showing a configuration of the communication control system according to the first exemplary embodiment.

The communication control system 1 is a system using a technology for extending a configuration of a computer using a network(s). The communication control system 1 performs communication processing so as to be able to selectively communicate between the devices 2 and 4. The communication control system 1 comprises a first device 2, a bridge connecting apparatus 3, a second device 4, another bridge connecting apparatus 5, and a network 6.

The first device 2 is a computer device capable of executing an OS (Operating System: Software).

The bridge connecting apparatus 3 is an apparatus that communicatably connects between the first device 2 and the network 6. The bridge connecting apparatus 3 has a function that performs communication processing so as to selectively communicate between the first device 2 and the second device 4 by cooperating with the other bridge connecting apparatus 5 that communicatably connects between the second device 4 and the network 6. The bridge connecting apparatus 3 comprises a connection state control part 7 and a connection state monitoring part 8.

The connection state control part 7 controls a first connection state between the bridge connecting apparatus 3 and the other bridge connecting apparatus 5. The connection state monitoring part 8 monitors a first connection state between the bridge connecting apparatus 3 recognized on the connection state control part 7 and the other bridge connecting apparatus 5 and a second connection state between the first device 2 recognized on the OS and the second device 4. When it is detected that the first connection state is at non-connection, the connection state monitoring part 8 instructs to the connection state control part 7 so that the first connection state does not come into connection. The connection state control part 7 controls so that the first connection state does not come into connection according to the instruction from the connection state monitoring part 8.

The second device 4 is an apparatus that can be used by being connected to the first device 2 via the system bus. The other bridge connecting apparatus 5 is an apparatus for communicatably connecting between the second device 4 and the network 6. The other bridge connecting apparatus 5 performs communication processing so as to be able to selectively communicate between the first device 2 and the second device 4 by cooperating with the bridge connecting apparatus 3 that communicatably connects between the first device 2 and the network 6. The network 6 is a communication network that communicatably connects between the bridge connecting apparatus 3 and the other bridge connecting apparatus 5.

Figure 2:
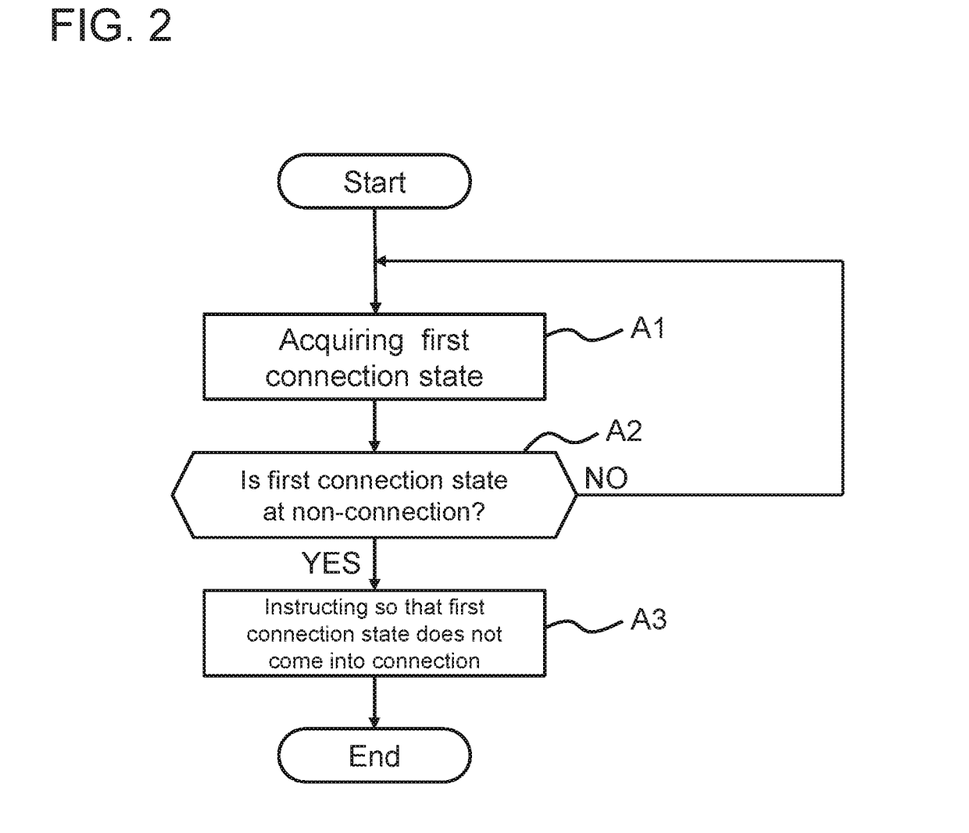
FIG. 2 is a flowchart schematically showing an operation of a connection state monitoring part of a bridge connecting apparatus in the communication control system according to the first exemplary embodiment.

Next, an operation (communication control method) of the communication control system according to the first exemplary embodiment will be explained with reference to drawings. FIG. 2 is a flow chart schematically showing an operation of the connection state monitoring part of the bridge connecting apparatus in the communication control system according to the first exemplary embodiment. As to the configuration parts of the communication control system according to the first exemplary embodiment, please refer to FIG. 1.

First, the connection state monitoring part 8 of the bridge connecting apparatus 3 acquires the first connection state recognized on the network 6 between the bridge connecting apparatus 3 and the other bridge connecting apparatus 5 from the connection state control part 7 (Step A1).

Next, the connection state monitoring part 8 decides whether or not the first connection state is at non-connection (Step A2). When the first connection state is at connection (NO of Step A2), then the process returns to Step A1. When the first connection state is at non-connection (YES of Step A2), the connection state monitoring part 8 controls so that the first connection state does not come into connection via the connection state control part 7 (Step A3), and then ends.

According to the first exemplary embodiment, even when a communication disconnection that can not be recognized at the OS level occurs, the first connection state recognized by the hardware on the connection state control part 7 can be matched with the second connection state recognized by the software on the OS by controlling so that the first connection state does not come into connection, and the system can be continuously operated.

Second Exemplary Embodiment

Figure 3:
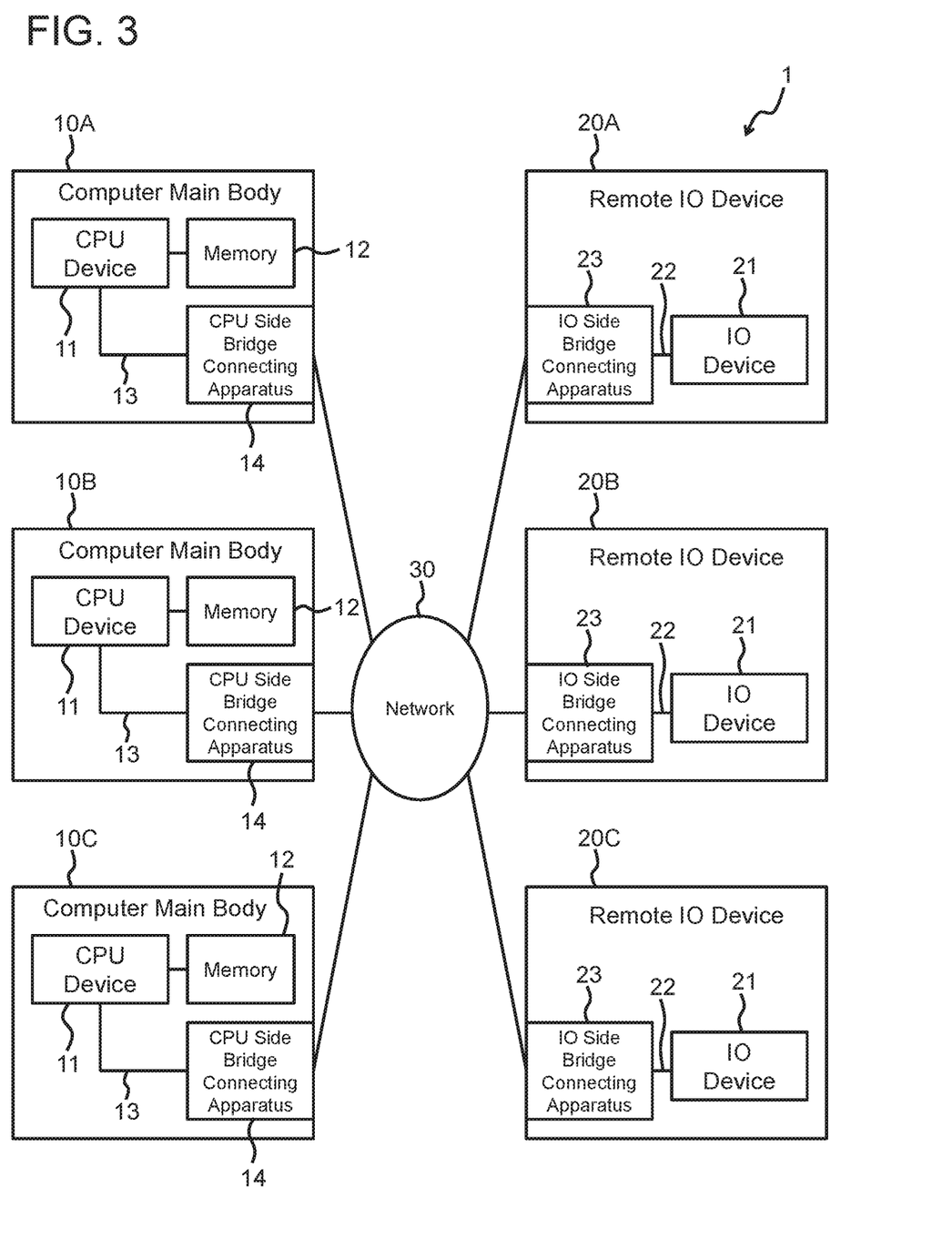
FIG. 3 is a block diagram schematically showing a configuration of an example of a communication control system according to a second exemplary embodiment.
Figure 4:
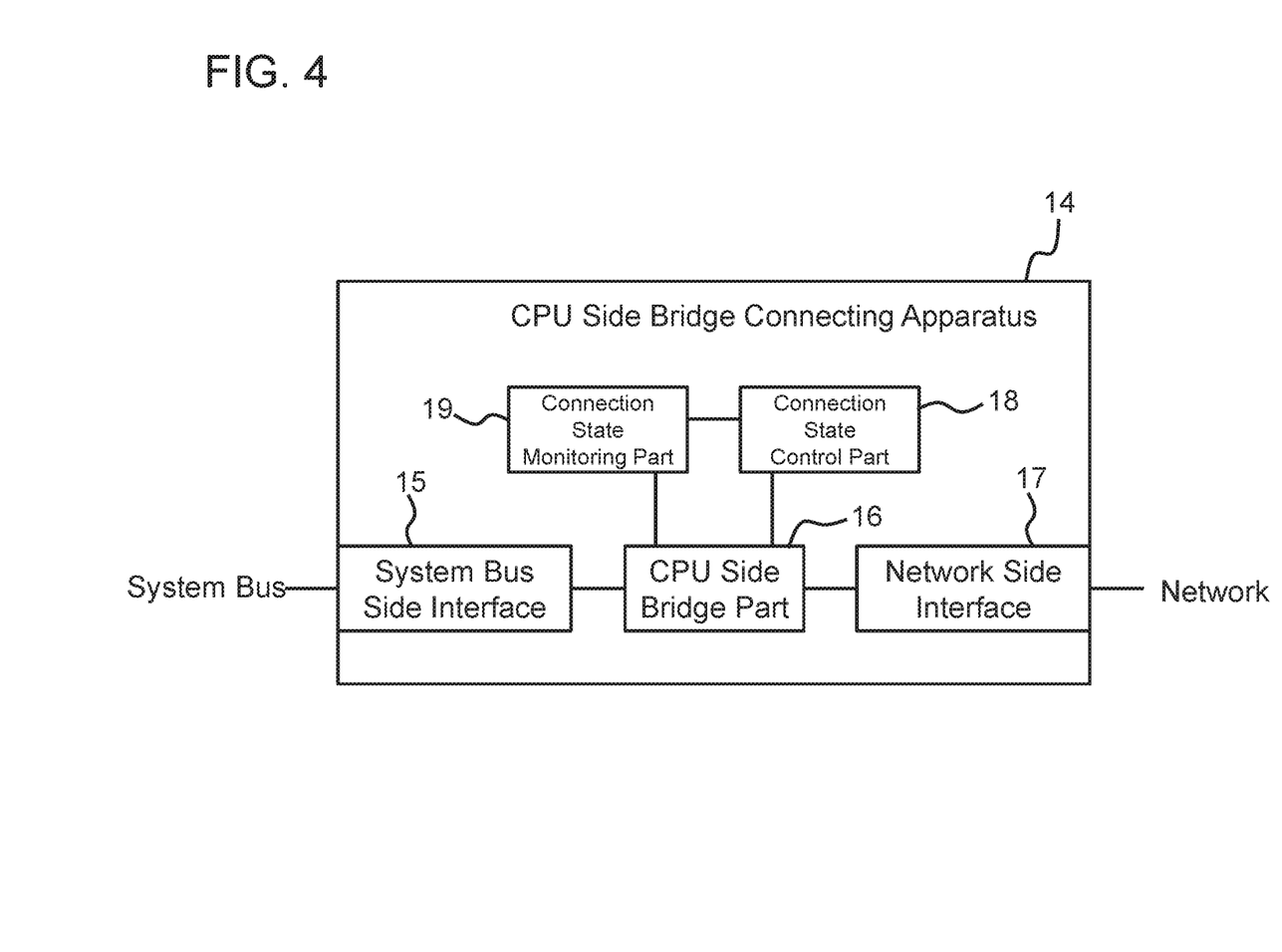
FIG. 4 is a block diagram schematically showing a configuration of a CPU side bridge connecting apparatus in the communication control system according to the second exemplary embodiment.
Figure 5:
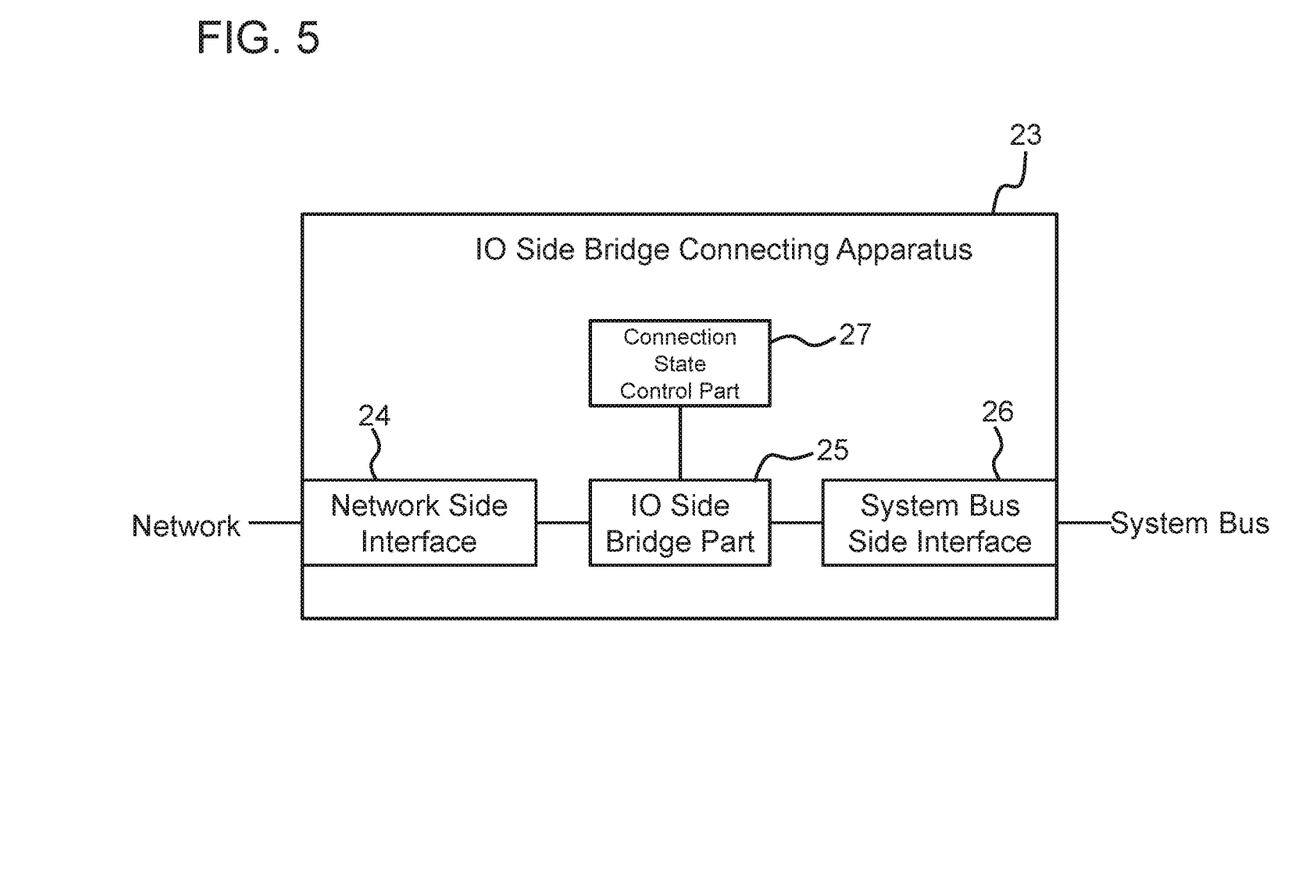
FIG. 5 is a block diagram schematically showing a configuration of an IO side bridge connecting apparatus in the communication control system according to the second exemplary embodiment.
Figure 6:
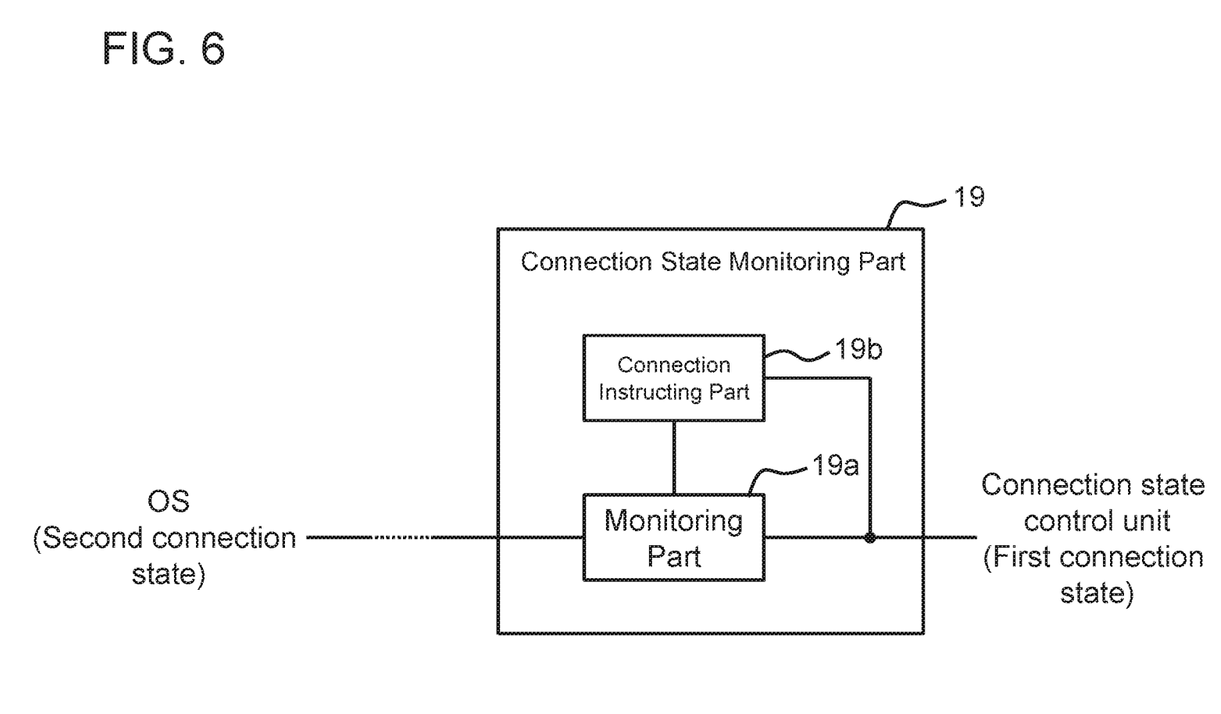
FIG. 6 is a block diagram schematically showing a configuration of a connection state monitoring part of a CPU side bridge connecting apparatus in the communication control system according to the second exemplary embodiment.
Figure 7:
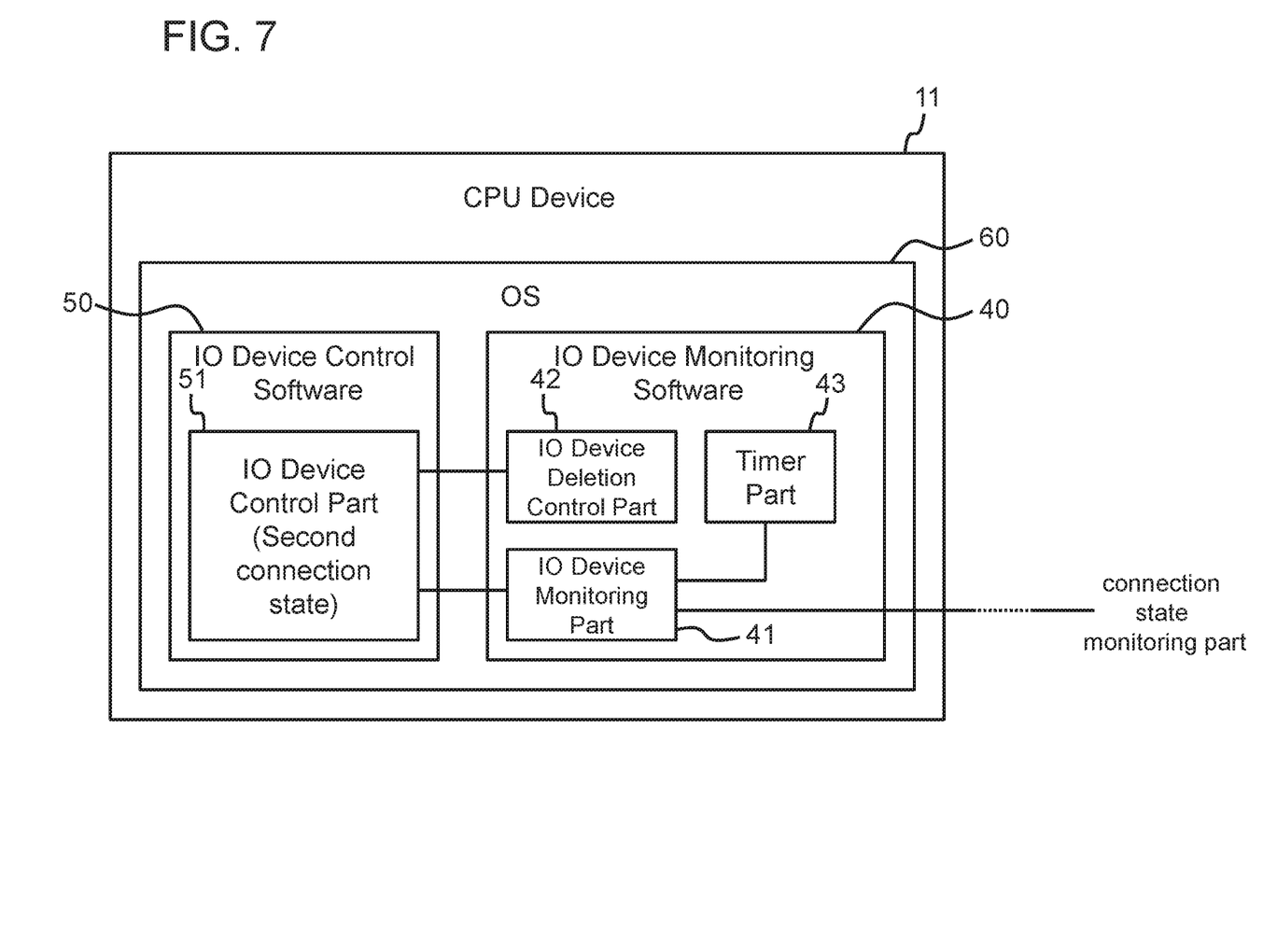
FIG. 7 is a block diagram schematically showing a configuration of function parts realized when an OS is executed by a CPU device in the communication control system according to the second exemplary embodiment.

A communication control system according to a second exemplary embodiment of the present invention will be explained with reference to drawings. FIG. 3 is a block diagram schematically showing a configuration of an example of the communication control system according to the second exemplary embodiment. FIG. 4 is a block diagram schematically showing a configuration of a CPU side bridge connecting apparatus in the communication control system according to the second exemplary embodiment. FIG. 5 is a block diagram schematically showing a configuration of an IO side bridge connecting apparatus in the communication control system according to the second exemplary embodiment. FIG. 6 is a block diagram schematically showing a configuration of a connection state monitoring part of the CPU side bridge connecting apparatus in the communication control system according to the second exemplary embodiment. FIG. 7 is a block diagram schematically showing a configuration of function parts realized when an OS is executed by a CPU device in the communication control system according to the second exemplary embodiment.

The communication control system 1 is a system using a technology for extending a configuration of a computer using a network 30 (see FIG. 3). The communication control system 1 has a function of performing communication processing so as to be able to selectively communicate between the corresponding CPU device 11 and IO device 21 corresponding to each other. The communication control system 1 comprises computer main bodies 10A, 10B and 10C, remote IO devices 20A, 20B and 20C, and the network 30.

The computer main bodies 10A, 10B and 10C are computers that are communicatably connected to the corresponding remote IO devices 20A, 20B and 20C via the network 30, respectively. The computer main bodies 10A, 10B and 10C comprise a CPU device 11, a memory 12, a system bus 13, and a CPU side bridge connecting apparatus 14.

The CPU device 11 is a computer device capable of executing an OS (Operating System: Software) 60 (see FIGS. 3 and 7). The CPU device 11 is communicatably connected to the IO device 21 via the IO side bridge connecting apparatus 23, the network 30 and the CPU side bridge connecting apparatus 14. The CPU device 11 also executes the IO device monitoring software 40 and the IO device control software 50 included in the OS 60.

The OS 60 is a software for managing and controlling the CPU device 11 and peripheral devices thereof (see FIG. 7).

The IO device monitoring software 40 is a software for monitoring the second connection state between the CPU device 11 and the IO device 21 corresponding to each other (see FIG. 7). The IO device monitoring software 40 realizes an IO device monitoring part 41, an IO device deletion control part 42, and the timer part 43 by executed in the CPU device 11.

The IO device monitoring part 41 monitors the second connection state between the CPU device 11 and the IO device 21 corresponding to each other recognized on the OS 60 (see FIGS. 3 and 7). The IO device monitoring part 41 acquires the second connection state recognized by the IO device control part 51 to provide the second connection state to the connection state monitoring part 19 by receiving a request for the second connection state from the connection state monitoring part 19 of the CPU side bridge connecting apparatus 14. The IO device monitoring part 41 decides whether or not the second connection state acquired from the IO device control part 51 is at connection or non-connection when receiving a request of the second connection state from the connection state monitoring part 19 of the CPU side bridge connecting apparatus 14. The IO device monitoring part 41 acquires the second connection state from the IO device control part 51 in response to a request for the second connection state from the connection state monitoring part 19 of the CPU side bridge connecting apparatus 14 when the second connection state acquired from the IO device control part 51 is at non-connection. The IO device monitoring part 41 starts a timer in the timer part 43 to count number of times by the timer part 43 after elapsing a predetermined time to reset the timer to decide whether or not the number of times counted by the timer part 43 has reached a predetermined number of times (for example, 10 times) when the second connection state acquired from the IO device control part 51 is at connection. The IO device monitoring section 41 acquires the second connection state from the IO device control part 51 in response to a request of the second connection state from the connection state monitoring parting section 19 of the CPU side bridge connecting apparatus 14 when the number of times counted by the timer part 43 does not have reached the predetermined number of times. The IO device monitoring section 41 instructs to delete the IO device 21 to the IO device deletion control part 42 when the number counted by the timer part 43 reaches the predetermined number of times. The IO device monitoring part 41 resets the number of times counted by the timer part 43 after instructing to delete the IO device 21. The number of times is the number of consecutive connections, and it is reset to 0 (zero) when acquiring a connection state of non-connection.

The IO device deletion control part 42 controls to delete the IO device 21 recognized by the OS 60 in response to the instruction for deleting the IO device 21 from the IO device monitoring part 41 (see FIGS. 3 and 7).

The timer part 43 has a timer function measuring a time elapsed in a state that the second connection state between the CPU device 11 and the IO device 21 corresponding to each other recognized on the OS 60 remains in connection. The timer part 43 has number counting function counting number of times when elapsing for a predetermined time in a state that the second connection state remains in connection. The timer part 43 is controlled by the IO device monitoring part 41. The timer part 43 further counts the number of times after elapsing for a predetermined time in a state that the second connection state remains in connection when the counted number of times does not have reached the predetermined number of times.

The IO device control software 50 is a software for controlling the second connection state between the CPU device 11 recognized on the OS 60 and the IO device 21. The IO device control software 50 realizes an IO device control part 51 by executed on the OS 60 of the CPU device 11.

The IO device control part 51 controls the second connection state between the CPU device 11 recognized on the OS 60 and the IO device 21. The IO device control part 51 controls so that the second connection state comes into connection when the second connection state is at non-connection. The IO device control part 51 waits until the second connection state comes into non-connection or deletes the IO device 21 from the OS 60 upon receiving a deletion control instruction of the IO device deletion control unit 42 after elapsing a predetermined time when the first connection state is at non-connection. The IO device control part 51 recognizes the IO device 21 again to control so that the second connection state comes into connection after deleting the IO device 21.

The memory 12 stores information such as predetermined data and software (see FIG. 3). The memory 12 is communicatably connected to the CPU device 11. The memory 12 can read and write information by control of the CPU device 11.

The system bus 13 communicatably connects between the system bus side interface 15 of the CPU side bridge connecting apparatus 14 and the CPU device 11 (see FIGS. 3 and 4).

The CPU side bridge connecting apparatus 14 is an apparatus that communicatably connects between the CPU device 11 and the network 30 (see FIGS. 3 and 4). The CPU side bridge connecting apparatus 14 performs communication processing so as to be able to selectively communicate between the CPU device 11 and the IO device 21 by cooperating with the IO side bridge connecting apparatus 23 for communicatably connecting between the IO device 21 and the network 30. The CPU side bridge connecting apparatus 14 has a unique identifier that does not overlap with the other CPU side bridge connecting apparatus 14 in the same network 30. The CPU side bridge connecting apparatus 14 is communicatably connected to the IO side bridge connecting apparatus 23 having the same identifier as its own identifier. The CPU side bridge connecting apparatus 14 configures a virtual system bus switch (for example, PCI Express Switch, etc.) by cooperating with the corresponding IO side bridge connecting apparatus 23. Thereby, it is equivalent to a state that the IO devices 21 in the remote IO devices 20A, 20B and 20C are directly connected to the corresponding computer main bodies 10A, 10B and 10C via the system bus. The CPU side bridge connecting apparatus 14 comprises a system bus side interface 15, a CPU side bridge part 16, a network side interface 17, a connection state control part 18, and a connection state monitoring part 19.

The system bus side interface 15 communicatably connects between the CPU device 11 and the CPU side bridge part 16 (see FIGS. 3 and 4). The system bus side interface 15 performs data transfer with the CPU as a system bus. The system bus side interface 15 is connected to the CPU device 11 via the system bus 13. As the system bus side interface 15, for example, PCI Express Bus or the like can be used.

The CPU side bridge part 16 configures a virtual system bus switch by combining with the IO side bridge part 25 (see FIGS. 3, 4 and 5). The CPU side bridge part 16 is controlled by the connection state control part 18 and performs communication processing so as to be able to selectively communicate between the CPU device 11 and the IO device 21 by cooperating with the IO side bridge connecting apparatus 23.

The network side interface 17 communicatably connects between the network 30 and the CPU side bridge part 16 (see FIGS. 3 and 4). The network side interface 17 performs data transfer between the network 30 and the CPU side bridge part 16.

The connection state control part 18 controls the first connection state between the CPU side bridge connecting apparatus 14 and the IO side bridge connecting apparatus 23 corresponding to each other by controlling the CPU side bridge part 16 (see FIGS. 3 and 4 reference). The connection state control part 18 controls so that the first connection state does not come into connection according to an instruction from the connection state monitoring part 19 for setting so that the first connection state does not come into connection. The connection state control part 18 controls so that the first connection state comes into connection according to an instruction from the connection state monitoring part 19 for setting so that the first connection state comes into connection.

The connection state monitoring part 19 monitors the first connection state between the CPU side bridge connecting apparatus 14 and the IO side bridge connecting apparatus 23 corresponding to each other recognized on the connection state control part 18 and the second connection state between the CPU device 11 and the IO device 21 corresponding to each other recognized on the OS 60 (see FIGS. 3, 4 and 7).

The connection state monitoring part 19 controls the connection state control part 18 so that the first connection state does not come into connection automatically even if communication recovers when short-term communication disconnection (the first connection state is at non-connection and the second connection state is at connection) that can not be detected by the OS 60 occurs. The connection state monitoring part 19 comprises a monitoring part 19a and a connection instructing part 19b (see FIG. 6).

The monitoring part 19a monitors the first connection state between the CPU side bridge connecting apparatus 14 and the IO side bridge connecting apparatus 23 corresponding to each other recognized on the connection state control part 18. The monitoring part 19a monitors the first connection state by acquiring the first connection state from the connection state control part 18 due to periodically requesting the first connection state against the connection state control part 18. The monitoring part 19a decides whether the acquired second connection state is at connection or non-connection. The monitoring part 19a instructs to the connection state control part 18 so that the first connection state does not come into connection (reconnection) via the connection instructing part 19b when the first connection state is at non-connection.

The monitoring part 19a monitors the second connection state between the CPU device 11 and the IO device 21 corresponding to each other recognized on the OS 60. The monitoring part 19a requests the second connection state to the IO device monitoring part 41 to monitor the second monitoring state by acquiring the second connection state from the IO device monitoring part 41 when the first connection state is at non-connection. The monitoring part 19a decides whether the acquired second connection state is at connection or non-connection. The monitoring part 19a instructs to the connection state control part 18 so that the first connection state comes into connection (reconnection)

via the connection instructing part 19*b* when the first connection state is at non-connection and the second connection state is at non-connection.

The connection instructing part 19*b* instructs whether or not to set so that the first connection state comes into connection to the connection state control part 18 based on the first connection state or the second connection state detected by the monitoring part 19*a*. The connection instructing part 19*b* instructs to the connection state control part 18 so that the first connection state does not come into connection when the monitoring part 19*a* detects that the first connection state is at non-connection. The connection instructing part 19*b* instructs to the connection state control part 18 so that the first connection state comes into connection when the monitoring part 19*a* detects that the second connection state is at non-connection after instructing to the connection state control part 18 so that the first connection does not come into connection. The connection instructing part 19*b* instructs to the connection state control part 18 so that the first connection state does not come into connection, when the monitoring part 19*a* detects that the second connection state is at connection, after instructing to the connection state control part 18 so that the first connection does not come into connection. The connection instructing part 19*b* instructs to the connection state control part 18 so that the first connection state comes into connection when it is detected that the second connection state comes into non-connection from connection while waiting after the monitoring part 19*a* detects that the second connection state is at connection. The connection state monitoring part 19 instructs to the connection state control part 18 so that the first connection state comes into connection when it is detected that the second connection state comes into non-connection by deleting the IO device 21 from the OS 60 due to the second connection state being at connection while waiting in the monitoring part 19*a*, when the first connection is at non-connection. The connection instructing part 19*b* instructs to the connection state control part 18 so that the first connection state comes into connection when the monitoring part 19*a* detects that the first connection state is at connection.

The remote IO devices 20A, 20B and 20C are IO devices that is accessible from the corresponding computer main bodies 10A, 10B and 10C via the network 30 (see FIGS. 3 and 5). The remote IO devices 20A, 20B and 20C comprise an IO device 21, a system bus 22, an IO side bridge connecting apparatus 23, a network side interface 24, an IO side bridge part 25, a system bus side interface 26 and a connection state control part 27.

The IO device 21 is an apparatus that can be connected to the CPU device 11 via a system bus and used (see FIG. 3). As the IO device 21, a computer resources capable of inputting and outputting information, for example, HDD (Hard Disc Drive), GPU graphic board (Graphics Processing Unit), and the like can be used. The IO device 21 is communicatably connected to the IO side bridge connecting apparatus 23 via the system bus 22.

The system bus 22 communicatably connects between the system bus side interface 26 of the IO side bridge connecting apparatus 23 and the IO device 21 (see FIGS. 3 and 5).

The IO side bridge connecting apparatus 23 is an apparatus that communicatably connects between the IO device 21 and the network 30 (see FIGS. 3 and 5). The IO side bridge connecting apparatus 23 performs communication processing so as to be able to selectively communicate between the CPU device 11 and the IO device 21 by cooperating with the CPU side bridge connecting apparatus 14 that communicatably connects between the CPU device 11 and the network 30. The IO side bridge connecting apparatus 23 has a unique identifier that does not overlap another IO side bridge connecting apparatus in the same network 30. The IO side bridge connecting apparatus 23 is communicatably connected to the CPU side bridge connecting apparatus 14 having the same identifier as its own identifier. The IO side bridge connecting apparatus 23 configures a virtual system bus switch (for example, PCI Express Switch, etc.) by cooperating with the corresponding CPU side bridge connecting apparatus 14. Thereby, it is equivalent to a state that the IO devices 21 in the corresponding remote IO devices 20A, 20B and 20C are directly connected to the computer main bodies 10A, 10B and 10C via the system bus. The IO side bridge connecting apparatus 23 comprises a network side interface 24, an IO side bridge part 25, a system bus side interface 26, and a connection state control part 27.

The network side interface 24 communicatably connects between the network 30 and the IO side bridge part 25 (see FIGS. 3 and 5). The network side interface 24 performs data transfer between the network 30 and the IO side bridge part 25.

The IO side bridge part 25 configures a virtual system bus switch by combining with the CPU side bridge part 16 (see FIGS. 3, 4 and 5). The IO side bridge part 25 is controlled by the connection state control part 27 and performs communication processing so as to be able to selectively communicate between the CPU device 11 and the IO device 21 by cooperating with the CPU side bridge connecting apparatus 14.

The system bus side interface 26 communicatably connects between the IO device 21 and the IO side bridge part 25 (see FIGS. 3 and 5). The system bus side interface 26 performs data transfer between the IO side bridge part 25 and the IO device 21. The system bus side interface 26 is connected to the IO device 21 via the system bus 22. As the system bus side interface 26, for example, a PCI Express Bus or the like can be used.

The connection state control part 27 controls the first connection state between the CPU side bridge connecting apparatus 14 and the IO side bridge connecting apparatus 23 corresponding to each other by controlling the IO side bridge part 25 (see FIGS. 3 and 5 reference). The connection state control part 27 controls so that the first connection state comes into connection automatically when the first connection state comes into non-connection.

The network 30 is a communication network that communicatably connects between the CPU side bridge connecting apparatus 14 of the computer main bodies 10A, 10B and 10C and the IO side bridge connecting apparatus 23 of the remote IO devices 20A, 20B and 20C corresponding to each other.

Figure 8:
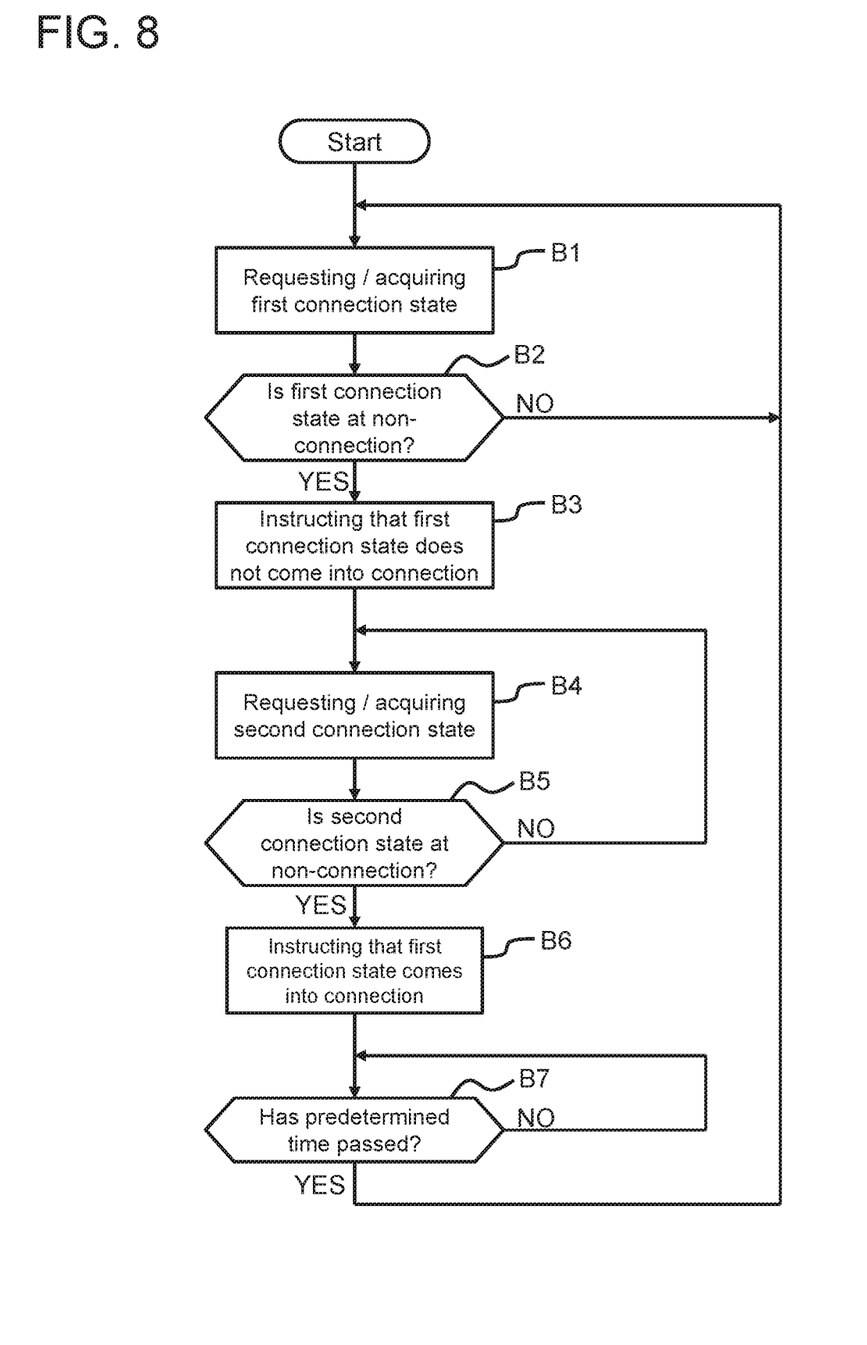
FIG. 8 is a flowchart schematically showing an operation of a connection state monitoring part of the bridge connecting apparatus in the communication control system according to the second exemplary embodiment.

Next, an operation of the connection state monitoring part of the bridge connecting apparatus in the communication control system according to the second exemplary embodiment will be explained with reference to drawings. FIG. 8 is a flowchart schematically showing the operation of the connection state monitoring part of the bridge connecting apparatus in the communication control system according to the second exemplary embodiment.

First, the monitoring part 19*a* requests the first connection state between the CPU side bridge connecting apparatus 14 recognized on the connection state control part 18 and the IO side bridge connecting apparatus 23 to the connection state control part 18 then to acquire the first connection state from the state control part 18 (Step B1).

After Step B1, the monitoring part 19*a* decides whether or not the acquired first connection state is at non-connection (Step B2). When the first connection state is at connection (NO of Step B2), then the process returns to Step B1.

When the first connection state is at non-connection (YES of Step B2), the monitoring part 19*a* instructs so that the first connection state does not come into connection to the connection state control part 18 via the connection instructing part 19*b* (Step B3). At this time, the connection state control part 18 will control so that the first connection state does not come into connection by receiving the instruction.

After Step B3 or when the second connection state is at connection (NO of Step B5), the monitoring part 19*a* requests the second connection state between the CPU device 11 recognized on the OS 60 and the IO device 21 to the IO device monitoring part 41 then to acquire the second connection state from the IO device monitoring part (Step B4). Step B4 may be performed after Step B2 or, simultaneously or before Step B3.

After Step B4, the monitoring part 19*a* decides whether or not the second connection state is at non-connection (Step B5). When the second connection state is at connection (NO of Step B5), then the process returns to Step B4.

When the second connection state is at non-connection (YES of Step B5), the monitoring part 19*a* instructs so that the first connection state comes into connection to the connection state control part 18 via the connection instructing part 19*b* (Step B6). At this time, the connection state control part 18 will control so that the first connection state comes into connection by receiving the instruction.

After Step B6, the monitoring part 19*a* decides whether or not a predetermined time elapses after instructing so that the first connection state comes into connection (Step B7). When the predetermined time does not elapse (NO of Step B7), then the process returns to Step B7. When the predetermined time elapses (YES of Step B7), then the process returns to Step B1.

Figure 9:
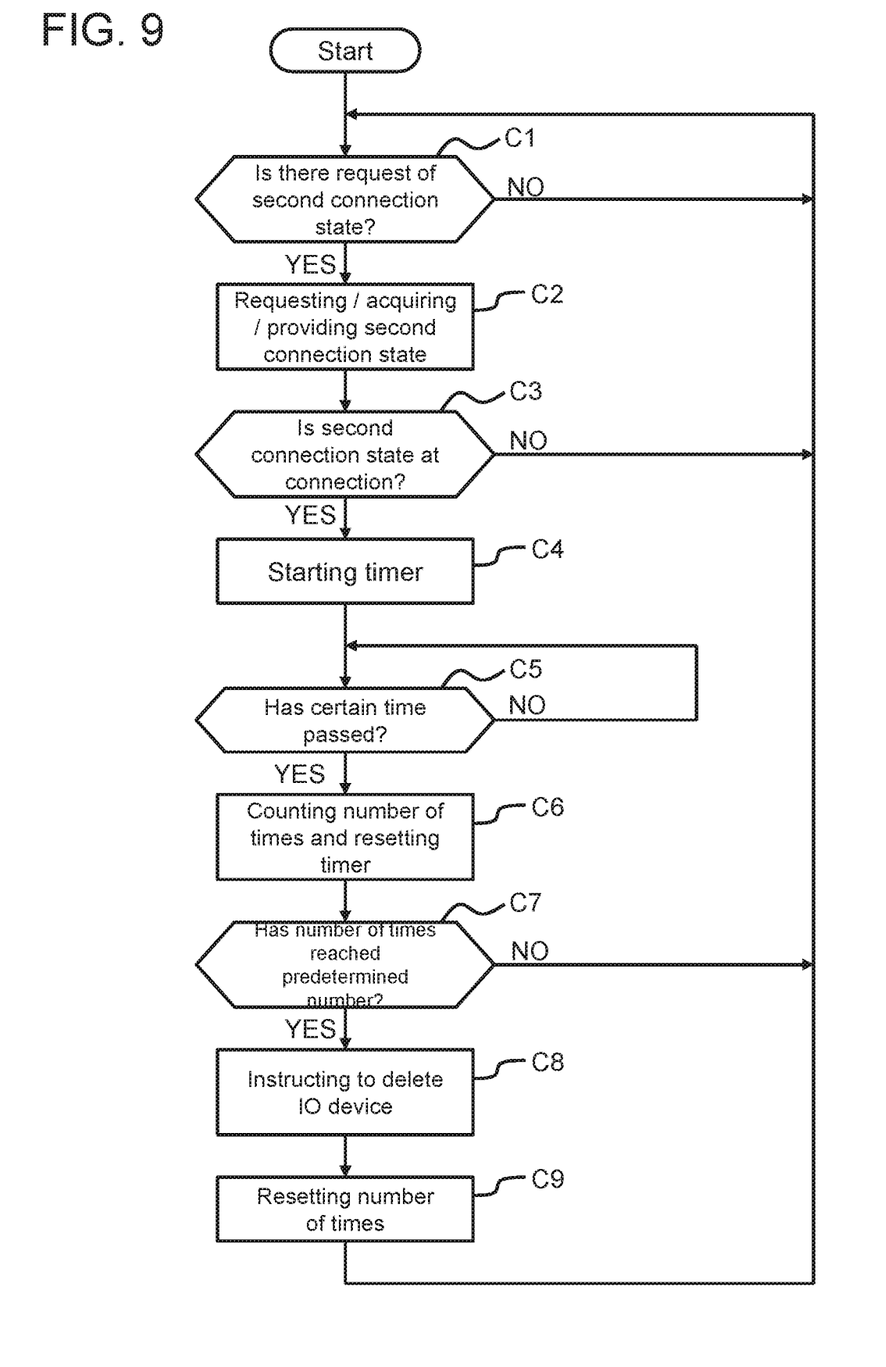
FIG. 9 is a flowchart schematically showing an operation of an IO device monitoring part executed by the CPU device in the communication control system according to the second exemplary embodiment.

Next, an operation of the IO device monitoring part of the CPU device in the communication control system according to the second exemplary embodiment will be explained with reference to drawings. FIG. 9 is a flowchart schematically showing the operation of the IO device monitoring part executed by the CPU device in the communication control system according to the second exemplary embodiment.

First, the IO device monitoring part 41 decides whether or not the second connection state is requested from the connection state monitoring part 19 (Step C1). When the second connection state is not requested (NO of Step C1), then the process returns to Step C1.

When the second connection state is requested (YES of Step C1), the IO device monitoring part 41 requests the second connection state to the IO device control part 51 then to acquire the second connection state from the IO device control part 51 then to provide the acquired second connection state to the connection state monitoring part 19 (Step C2). The IO device monitoring part 41 will repeat Step C2 every time there is a request for the second connection state from the connection state monitoring part 19 and it will provide the latest second connection state to the connection state monitoring part 19.

Next, the IO device monitoring part 41 decides whether or not the acquired second connection state is at connection (Step C3). When the second connection state is at non-connection (NO of Step C3), then the process returns to Step C1.

When the second connection state is at connection (YES of Step C3), the IO device monitoring part 41 starts a timer in the timer part 43 (Step C4).

After Step C4, the IO device monitoring part 41 decides whether or not a predetermined time elapses after starting the timer in the timer part 43 (Step C5). When the predetermined time does not elapse (NO of Step C5), then the process returns to Step C5.

When a predetermined time elapses (YES of Step C5), the IO device monitoring part 41 counts number of times in the timer part 43 and resets the timer (Step C6).

After Step C6, the IO device monitoring part 41 decides whether or not the counted number of times reaches a predetermined number of times (Step C7).

When the number of times does not reach the predetermined number of times (NO of Step C7), then the process returns to Step C1.

When the number of times reaches the predetermined number of times (YES of Step C7), the IO device monitoring part 41 instructs to the IO device control part 51 so as to delete the IO device 21 (Step C8). At this time, the IO device control part 51 will delete the IO device 21 recognized on the OS 60 by receiving the instruction, then it will recognize the IO device 21 again to control so that the second connection state comes into connection.

After Step C8, the IO device monitoring part 41 resets the number of times in the timer part 43 (Step C9), then the process returns to Step C1.

According to the second exemplary embodiment, even when a communication disconnection (a state that first connection state is at non-connection and second connection state is at connection) which can not be detected at the OS software level on the network 30 occurs, by controlling the operation of the connection state control unit 18 by the connection state monitoring part 19 of the CPU side bridge connecting apparatus 14, it is possible to prevent a mismatch between the first connection state on the hardware and the second connection state on the software and to continuously operate the system.

(Appendix)

In the present invention, it is possible to set to a mode of the bridge connecting apparatus according to the first aspect.

In the bridge connecting apparatus according to the first aspect, it is preferable to set as follows.

The connection state monitoring part instructs to the connection state control part so that the first connection state comes into connection when it is detected that the second connection state is at non-connection, after instructing the connection state control part so that the first connection state does not come into connection, and the connection state control part controls so that the first connection state comes into connection according to the instruction from the connection state monitoring part.

In the bridge connecting apparatus according to the first aspect, it is preferable to set as follows.

The connection state monitoring part instructs to the connection state control part so that the first connection state does not come into connection when it is detected that the second connection state is at connection after instructing the connection state control part so that the first state connect does not come into connection, and the connection state control part controls so that the first connection state does not come into connection according to the instruction from the connection state monitoring part.

In the bridge connecting apparatus according to the first aspect, it is preferable to set as follows.

The connection state monitoring part instructs to the connection state control part so that the first connection state does not come into connection when it is detected that the second connection state comes into non-connection from connection while waiting after detecting that the second connection state is at connection, and The connection state control part controls so that the first connection state comes into connection according to the instruction from the connection state monitoring part.

In the bridge connecting apparatus according to the first aspect, it is preferable to set as follows.

The connection state monitoring part instructs to the connection state control part so that the first connection state comes into connection when it is detected that the second connection state comes into non-connection by deleting the second device from the OS due to the second connection state being at connection while waiting as described above, and the connection state control part controls so that the first connection state comes into connection according to the instruction from the connection state monitoring part.

In the bridge connecting apparatus according to the first aspect, it is preferable to set as follows.

The bridge connecting apparatus further comprises:

a bridge part which is controlled by the connection state control part and performs communication processing so as to be able to selectively communicate between the first device and the second device by cooperating with the other bridge connecting apparatus;

a system bus side interface that is connected to the first device via a system bus and communicatably connects between the first device and the bridge part; and a network side interface that communicatably connects between the network and the bridge part.

In the bridge connecting apparatus according to the first aspect, it is preferable to set as follows.

The connection state monitoring part comprises:

a monitoring part that monitors the first connection state recognized on the connection state control part and monitors the second connection state recognized on the OS; and a connection instructing part that instructs whether or not that the first connection state comes into connection based on the first connection state or the second connection state detected by the monitoring part.

In the bridge connecting apparatus according to the first aspect, it is preferable to set as follows.

The monitoring part monitors the first connection state by periodically requesting the first connection state to the connection state control part then acquiring the first connection state from the connection state control part.

In the bridge connecting apparatus according to the first aspect, it is preferable to set as follows.

The monitoring part monitors the second connection state by periodically requesting the second connection state to the OS then acquiring the second connection state from the OS after detecting that the first connection state is at non-connection.

In the present invention, it is possible to set to a mode of the communication control system according to the second aspect.

In the present invention, it is possible to set to a mode of the communication control method according to the third aspect.

In the communication control method according to the third aspect, it is preferable to further comprise: acquiring a second connection state between the first device recognized on the OS and the second device after controlling so that the first connection state does not come into connection; deciding whether or not the acquired second connection state is at non-connection; and controlling so that the first connection state comes into connection when the second connection state is at non-connection.

In the communication control method according to the third aspect, it is preferable to control so that the first connection state does not come into connection, when the second connection state is at connection after controlling so that the first connection state does not come into connection.

In the communication control method according to the third aspect, it is preferable to control so that the first connection state comes into connection when the second connection state changes from connection to non-connection while waiting after recognizing that the second connection state is at connection.

In the communication control method according to the third aspect, it is preferable to control so that the first connection state comes into connection when the second connection state comes into non-connection by deleting the second device from the OS due to the second connection state being at connection while waiting as described above.

In the present invention, it is possible to set to a mode of the communication control program according to the fourth aspect.

In the communication control program according to the fourth aspect, it is preferable to further execute: deciding whether the acquired second connection state is at connection or non-connection; counting number of times when a predetermined time has elapsed while the second connection state remains in connection; deciding whether or not the number of times has reached a predetermined number of times; and deleting the second device from the OS when the number of times has reached the predetermined number of times.

In a first device according to a fifth aspect, it is possible to set to a mode as follows.

The first device capable of executing an OS and communicatably connected to a second device via another bridge connecting apparatus, a network(s) and a bridge connecting apparatus, comprising a second device monitoring part that monitors a second connection state between the first device recognized on the OS and the second device, acquires the second connection state recognized on the OS in response to a request of the second connection state from the bridge connecting apparatus, and provides the acquired second connection state to the bridge connecting apparatus.

In the first device according to the fifth aspect, it is preferable to set as follows.

The second device monitoring part decides whether the second connection state is at connection or non-connection when receiving a request of the second connection state from the bridge connecting apparatus, the first device further comprises:

a timer part having a function of measuring time elapsed while the second connection state remains in connection and having a function of counting number of times when a predetermined time has elapsed while the second connection state remains in connection; and a second device deletion control part that controls to delete the second device from the OS in response to an instruction to delete the second device from the second device monitoring part, the second device monitoring part counts the number of times when a predetermined time has elapsed while the second connection state remains in connection in the timer part, and decides whether or not the number of times counted by the timer part has reached a predetermined number of times, and instructs to delete the second device to the second device deletion control part when the number of times counted by the timer part has reached the predetermined number of times.

In a communication control method according to a sixth aspect, it is possible to set to a mode as follows.

The communication control method performed on a first device capable of executing an OS and communicatably connected to a second device via another bridge connecting apparatus, a network(s), and a bridge connecting apparatus, comprising:

monitoring a second connection state between the first device recognized on the OS and the second device, and acquiring the second connection state recognized on the OS in response to a request of the second connection state from the bridge connecting apparatus and providing the acquired second connection state to the bridge connecting apparatus.

In the communication control method according to the sixth aspect, it is preferable to set as follows.

The communication control method further comprises: deciding whether the acquired second connection state is at connection or non-connection;

counting number of times when a predetermined time has elapsed while the second connection state remains in connection;

deciding whether or not the number of times has reached the predetermined number of times, deleting the second device from the OS when the number of times has reached the predetermined number of times.

The disclosure of the above patent literature is incorporated in the present application by reference thereto. Within the ambit of the entire disclosure (including the claims and drawings) of the present invention, it is possible to change/adjust the exemplary embodiments or examples based on a basic technical thought thereof furthermore. Also, various combinations or selections of various disclosed elements (including each element of each claim, each element of each exemplary embodiment or each example, each element of each drawing, etc.) can be performed within the ambit of the entire disclosure of the present invention. That is, it goes without saying that the present invention includes various transformations and modifications which could be achieved by one skilled in the art according to the entire disclosure including the scope and drawings and the technical thought. Also with respect to the numerical values and numerical ranges described in the present application, any intermediate value, subordinate numerical value, and subrange thereof are regarded to be described even without explicit recital.

What is claimed is:

1. A bridge connecting apparatus for communicatably connecting between a first device capable of executing an OS and a network, wherein the bridge connecting apparatus performs communication processing so as to selectively communicate between the first device and a second device by cooperating with another bridge connecting apparatus that communicatably connects between the second device and the network, the bridge connecting apparatus comprises:

a connection state control part that controls a first connection state between the bridge connecting apparatus and the other bridge connecting apparatus; and a connection state monitoring part that monitors the first connection state recognized on the connection state control part and a second connection state between the first device and the second device, the second connection state being recognized on the OS, the connection state monitoring part instructs to the connection state control part so that the first connection state does not come into connection when it is detected that the first connection state is at non-connection, and the connection state control part controls so that the first connection state does not come into connection according to the instruction from the connection state monitoring part.

2. The bridge connecting apparatus according to claim 1, wherein the connection state monitoring part instructs to the connection state control part so that the first connection state comes into connection when it is detected that the second connection state is at non-connection, after instructing the connection state control part so that the first connection state does not come into connection, and the connection state control part controls so that the first connection state comes into connection according to the instruction from the connection state monitoring part.

3. The bridge connecting apparatus according to claim 1, wherein the connection state monitoring part instructs to the connection state control part so that the first connection state does not come into connection when it is detected that the second connection state is at connection alter instructing the connection state control part so that the first state connect does not come into connection, and the connection state control part controls so that the first connection state does not come into connection according to the instruction from the connection state monitoring part.

4. The bridge connecting apparatus according to claim 3, wherein the connection state monitoring part instructs to the connection state control part so that the first connection state does not come into connection when it is detected that the second connection state comes into non-connection from connection after instructing the connection state control part not to connect the first connection state by detecting that the second connection state is at connection, and the connection state control part controls so that the first connection state comes into connection according to the instruction from the connection state monitoring part.

5. The bridge connecting apparatus according to claim 4, wherein the connection state monitoring part instructs to the connection state control part so that the first connection state comes into connection from connection when it is detected that the second connection state comes into non-connection by deleting the second device from the OS after instructing the connection state control part not to connect the first connection state by detecting that the second connection state is at connection, and the connection state control part controls so that the first connection state comes into connection according to the instruction from the connection state monitoring part.

6. The bridge connecting apparatus according to claim 1, further comprising:

a bridge part which is controlled by the connection state control part and performs communication processing so as to be able to selectively communicate between the first device and the second device by cooperating with the other bridge connecting apparatus;
a system bus side interface that is connected to the first device via a system bus and communicatably connects between the first device and the bridge part; and
a network side interface that communicatably connects between the network and the bridge part.

7. The bridge connecting apparatus according to claim 1, wherein
the connection state monitoring part comprises:
a monitoring part that monitors the first connection state recognized on the connection state control part and monitors the second connection state recognized on the OS; and
a connection instructing part that instructs whether or not that the first connection state comes into connection based on the first connection state or the second connection state detected by the monitoring part.

8. A communication control system, comprising:
the bridge connecting apparatus according to claim 1;
a first device;
another bridge connecting apparatus;
a second device; and
a network(s).

9. A communication control method for performing communication control so as to be able to selectively communicate between a first device capable of executing an OS and a second device by a bridge connecting apparatus cooperating with another bridge connection apparatus, the bridge connecting apparatus communicatably connecting between the first device and a network, and the other bridge connecting apparatus communicatably connecting between the second device and the network, the method comprising:
acquiring a first connection state between the bridge connecting apparatus and the other bridge connecting apparatus in the bridge connection apparatus, the first connection state being recognized on the bridge connection apparatus;
deciding whether the first connection state is at connection or non-connection in the bridge connection apparatus;
controlling so that the first connection state does not come into connection when the first connection state is at non-connection in the bridge connection apparatus;
acquiring a second connection state between the first device and the second device recognized by an OS in the bridge connection apparatus;
deciding whether the second connection state is at connection or non-connection in the bridge connection apparatus; and
controlling so that the first connection state comes to connection when the second connection state is not at non-connection after controlling so that the first connection state comes to non-connection in the bridge connection apparatus.

* * * * *